Oct. 7, 1958   W. E. SLAVENS   2,854,806
CORN PICKER
Filed Feb. 5, 1957
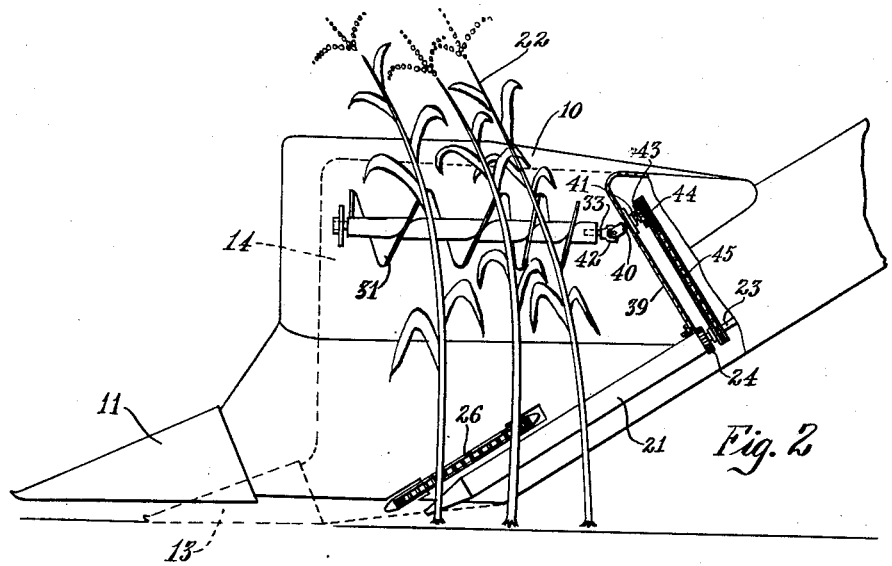
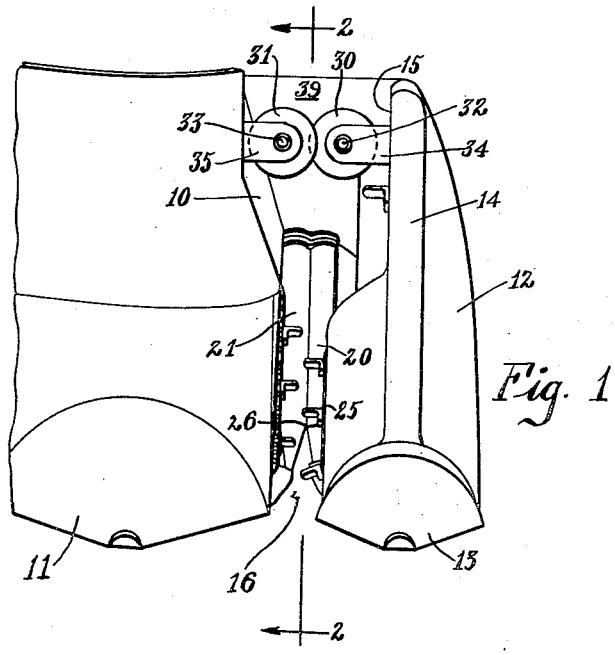
INVENTOR.
W. E. Slavens
Attorneys

United States Patent Office 2,854,806
Patented Oct. 7, 1958

2,854,806
CORN PICKER

Wayne E. Slavens, Des Moines, Iowa, assignor, by mesne assignments, to Deere & Company, a corporation of Delaware Application February 5, 1957, Serial No. 638,368

7 Claims. (Cl. 56—103)

This invention relates to a corn harvester. Still more particularly the invention relates to a harvesting mechanism which operates to prevent accumulation of trash which would normally clog the harvesting mechanism.

In conventional type cornpickers, the harvesting mechanism normally includes a pair of fore-and-aft extending rolls spaced apart transversely to form a fore-and-aft extending stalk passage between them. As the harvester moves forwardly over the corn field stalks in the row will successively enter the stalk passage and the snapping rolls will tend to draw the stalks downwardly until the ears on the stalks contact the snapping rolls and are severed from the stalks. In theory at least, it is expected that accumulation of stalks and other trash is prevented from occurring in the harvesting mechanism through operation of the snapping rolls, it being expected that by the time the stalks have reached the rear end of the snapping rolls, the snapping rolls will have driven the stalks downwardly and clear of the harvester. However, in actual operation, there is a normal accumulation of stalks above the snapping rolls which, upon the harvester moving through a heavy growth of stalks, or due to poor moisture conditions of the stalks, the stalks accumulate at the rear ends of the snapping rolls to such a degree that the machine will eventually become clogged requiring shut-down of the harvesting unit for purposes of clearing the stalks from the clogged area. Also, while it has always been the recommendation of manufacturers to shut-down the harvesting machine while clearing the accumulated stalks from the rolls, many operators will inadvertently or by preference maintain the snapping rolls in operation to aid in the clearing process, thus resulting in a potential dangerous condition for the operator.

It is therefore the primary object of this invention to provide with the harvesting mechanism means which will prevent, or materially reduce the tendency for the stalks to accumulate or clog the unit.

The specific manner in which the above object is accomplished is by providing a pair of cooperating augers above the respective snapping rolls which feed the stalks through the stalk passage in a progressively reducing rate of movement rearward. The pitch of the flight are progressively reduced from front to rear, thus operating to reduce the rate of feeding of the stalks rearwardly. By the use of augers in this manner, should the harvester enter into a particularly heavy growth of stalks, the stalks will be prevented from clogging the rear end of the harvester, but will be substantially evenly spread over the fore-and-aft length of the snapping rolls.

Other objects and advantages of the invention will become apparent to those skilled in the art as the nature of the invention is better understood from the following detailed description as shown in the accompanying drawings.

Fig. 1 is a front end view of a part of a corn harvester which incorporates the features of this invention.

Fig. 2 is a sectional view taken along the lines 2—2 of Fig. 1.

The corn picker herein shown may be of any conventional type, being either a tractor mounted or a drawn type implement. The particular type shown is tractor mounted having forwardly extending gathering structure including side sheets 10 positioned alongside the tractor body, not shown, and forming a central divider point 11, which is normally located ahead of the tractor front wheels. Positioned outwardly from the central shielding 10 is a gatherer side sheet 12 including a forwardly extending divider point 13. The side sheets 12 are characterized by having a substantially upright portion 14 having a vertical surface 15 facing inwardly toward the tractor. The points 11 and 13 form a throat 16 for purposes of receiving stalks of a row into the harvesting mechanism. For purposes of orientation the upright portion 14 is shown in dotted representation in Fig. 2.

The harvesting mechanism itself comprises a pair of fore-and-aft extending rolls 20, 21 which form between them a fore-and-aft extending stalk passage through which stalks, as at 22, may be received from the throat 16. As is conventional, the rolls 20, 21 operate to have their adjacent portions moving downwardly so as to engage the stalks 22 and to drive them downwardly. The rolls 20, 21 are normally provided with aggressive type lugs or ribs which, while not shown, facilitate their effectiveness in moving the stalks downwardly. The rolls 20, 21 are driven from their rear ends by means of a drive shaft 23 which is directly connected to one of the snapping rolls, and a pair of cooperating spur gears, as at 24 which operate to drive the other snapping roll through operation of the first.

Positioned at the forward end of the snapping rolls 20, 21 is a pair of gathering chains 25, 26 respectively. The gathering chains 25, 26 also operate in the conventional manner serving to engage the stalks at the forward end of the harvesting mechanism and to move the stalks rearwardly as they enter between the snapping rolls 20, 21. Details of the driving mechanism for the gathering chains 25, 26 as well as the driving mechanism for the snapping rolls 20, 21, while not shown in detail, is conventional and should further detail be desired, is available in a U. S. Patent 2,622,382 issued to W. E. Slavens December 23, 1952.

Conveyor means in the form of a pair of cooperating augers 30, 31 is positioned above the snapping rolls 20, 21. It may be noted from reviewing Fig. 2 that the forward ends of the augers 30, 31 are vertically spaced from the lower end of the snapping rolls 20, 21 at a distance that the ear on the stalks will move below the augers thereby preventing the ears from being prematurely separated from the stalks. The augers 30, 31 are mounted on horizontally disposed fore-and-aft extending drive shafts 32, 33, respectively. The shafts 32, 33 are journaled at their forward ends on supports or brackets 34, 35. The bracket 34 is fixed to the upright portion 14 and extends inwardly from the face 15. The bracket 35 is fixed to the central side shielding 10 and projects outwardly over the snapping rolls 20, 21. The augers 30, 31 are supported at their rear end by means of transverse upright housing structure 39. The manner of the rear support for the augers is shown in Fig. 2 and comprises a short stub shaft 40 journaled at 41 to the housing structure 39. The shaft 40 is angled relative to the drive shaft 33 and is connected to the shaft 33 by means of a universal joint 42. The shaft 40 is provided with a pair of sprockets behind the structure 39. The sprocket 44 has a chain 45 mounted on it which in turn is driven from a suitable drive sprocket mounted on the shaft 23. The sprocket 43 is also provided with a short shaft which extends over to a sprocket, not shown, but which is identical to the sprocket 43 and operates to drive the short stub shaft, not shown, which drives the left auger drive shaft 32.

As may be seen clearly in Fig. 2 the pitch of the augers 30, 31 progressively decreases from front to rear. Therefore, upon rotation of the augers the rate of feeding of the upper portions of stalks rearwardly by the auger progressively decreases so that the stalks at the rear end of the augers are moving substantially slower than the forward progress of the corn picker. Consequently, the stalks will tend to lean forwardly as shown in Figure 2. The stalks are therefore prevented from ganging or clogging at the rear end of the snapping rolls 20, 21. Thus, the tendency to crowd or clog the rear end of the snapping rolls is prevented inasmuch as the feeding of the stalks rearwardly will be spread over a longer distance fore-and-aft.

Only one form of the invention has been shown, but it should be clearly understood that other forms would undoubtedly occur to one skilled in the art. It is therefore to be understood that the present details are provided for the purpose of clearly and concisely illustrating the principles of the invention and not to limit the invention beyond that which is broadly claimed.

What I claim is:

1. In a corn harvester having a forwardly extending gathering structure forming a fore-and-aft extending stalk passage and adapted to move over a field of row planted corn to successively receive stalks into the passage, the improvement comprising: upright structure rising from the gathering structure and including an upright transverse portion adjacent the structure forming a rear portion of the passage and upright portions positioned on opposite sides and outwardly respectively of the passage and extending forwardly from the transverse portion; a pair of parallel rotating augers having forward and rear end portions positioned above and on opposite sides of the passage and having cooperating auger flights adapted to engage upper portions of the stalks as they move through the harvester, the pitch of the auger flights being progressively reduced from front to rear for progressively reducing rearward movement of the upper portion of the stalks; support means on said transverse portion for supporting the rear portion of the augers; and support means extending inwardly relative to the passage from the fore-and-aft extending upright portions for supporting the forward end of the augers.

2. In a corn harvester having a forwardly extending gathering structure forming a fore-and-aft extending stalk passage and adapted to move over a field of row planted corn to successively receive stalks into the passage, the improvement comprising: upright structure rising from the gathering structure and including fore-and-aft extending upright portions on opposite sides and outwardly respectively of the passage; a pair of parallel rotating augers positioned above and on opposite sides of the passage and having cooperating auger flights adapted to engage the upper portions of the stalks as they move through the harvester, the pitch of the auger flights being progressively reduced from front to rear for progressively reducing rearward movement of the upper portion of the stalks; and support means extending inwardly relative to the passage from the fore-and-aft extending upright portions for supporting the augers.

3. In a corn harvester having a forwardly extending gathering structure forming a fore-and-aft extending stalk passage and adapted to move over a field of row planted corn to successively receive stalks into the passage, the improvement comprising: upright structure rising from the gathering structure and including fore-and-aft extending upright portions on opposite sides and outwardly respectively of the passage; fore-and-aft extending auger means positioned above the passage and having auger flight means thereon adapted to engage the upper portions of the stalks as they move through the harvester, the pitch of the auger flight means being progressively reduced from front to rear for progressively reducing rearward movement of the upper portion of the stalks; and support means extending inwardly relative to the passage from the fore-and-aft extending upright portions for supporting the auger means.

4. In a corn harvester having a forwardly extending frame structure forming a fore-and-aft extending stalk passage and adapted to move over a field of row planted corn to successively receive stalks into the passage, the improvement comprising: a pair of parallel and horizontal rotating augers supported on the frame structure and positioned above and on opposite sides of the passage, said augers having cooperating auger flights adapted to engage the upper portions of the stalks as they move through the harvester, the pitch of the auger flights being progressively reduced from front to rear for progressively reducing rearward movement of said upper portion as the stalks move through the harvester.

5. In a corn harvester having a forwardly extending frame structure forming a fore-and-aft extending stalk passage and adapted to move over a field of row planted corn to successively receive stalks into the passage, the improvement comprising: auger means supported on the frame structure and positioned above the passage, said auger means including at least one auger having an auger flight adapted to engage the upper portions of the stalks as they move through the harvester, the pitch of the auger flight being progressively reduced from front to rear for progressively reducing rearward movement of said upper portions as the stalks move through the harvester.

6. In a corn harvester having a forwardly extending gathering structure forming a fore-and-aft extending stalk passage and adapted to move over a field of row planted corn to successively receive stalks into the passage, and harvesting means including a pair of cooperating fore-and-aft extending rotating rolls on opposite sides of the passage and inclined rearwardly, the improvement comprising; upright structure rising from the gathering structure and including fore-and-aft extending upright portions positioned on opposite sides and outwardly respectively of the passage; a pair of parallel and substantially horizontal augers positioned above and on opposite sides of the passage and having cooperating auger flights adapted to engage the upper portion of the stalks as they move through the harvester, the pitch of the auger flights being progressively reduced from front to rear for progressively reducing rearward movement of the upper portion of the stalks, support means extending inwardly relative to the passage from the fore-and-aft extending upright portions for supporting the augers; and drive means on the harvester for rotating the augers to move the upper portion of the stalks rearwardly at a rate progressively slower than the forward movement of the harvester.

7. In a corn harvester having a forwardly extending gathering structure forming a fore-and-aft extending stalk passage and adapted to move over a field of row planted corn to successively receive stalks into the passage, and harvesting means including a pair of cooperating fore-and-aft extending rotating rolls on opposite sides of the passage and inclined rearwardly the improvement comprising: upright structure rising from the gathering structure and including fore and aft extending upright portions positioned on opposite sides and outwardly respectively of the passage; fore-and-aft extending conveyor means above the rolls and adapted to engage the upper portion of the stalks as they move through the harvester and to progressively reduce rearward movement of the upper portion of the stalks as they move from front to rear; and support means extending inwardly relative to the passage from the fore-and-aft extending upright portions for supporting the conveyor means.

References Cited in the file of this patent

UNITED STATES PATENTS

| | | |
|---|---|---|
| 1,023,320 | Kaull | Apr. 18, 1912 |
| 2,351,807 | Court | June 20, 1944 |
| 2,501,782 | Mock | Mar. 28, 1950 |